Patented Jan. 15, 1924.

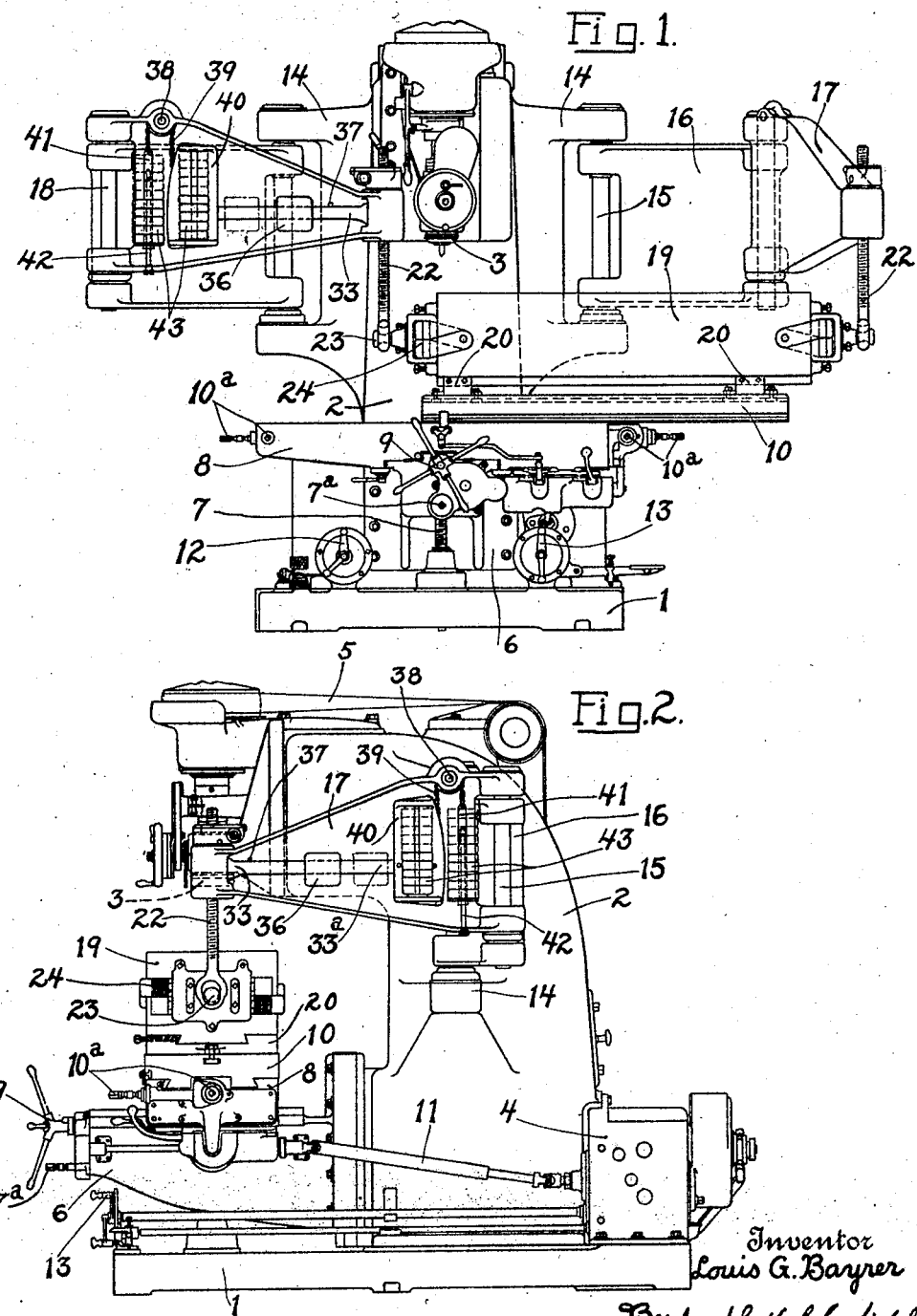

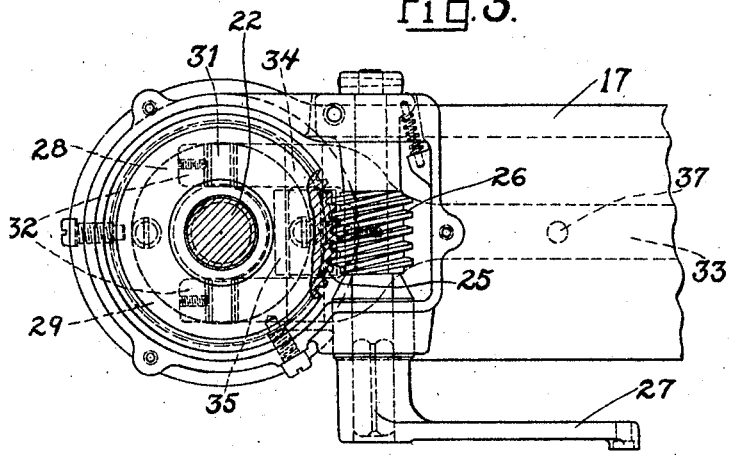
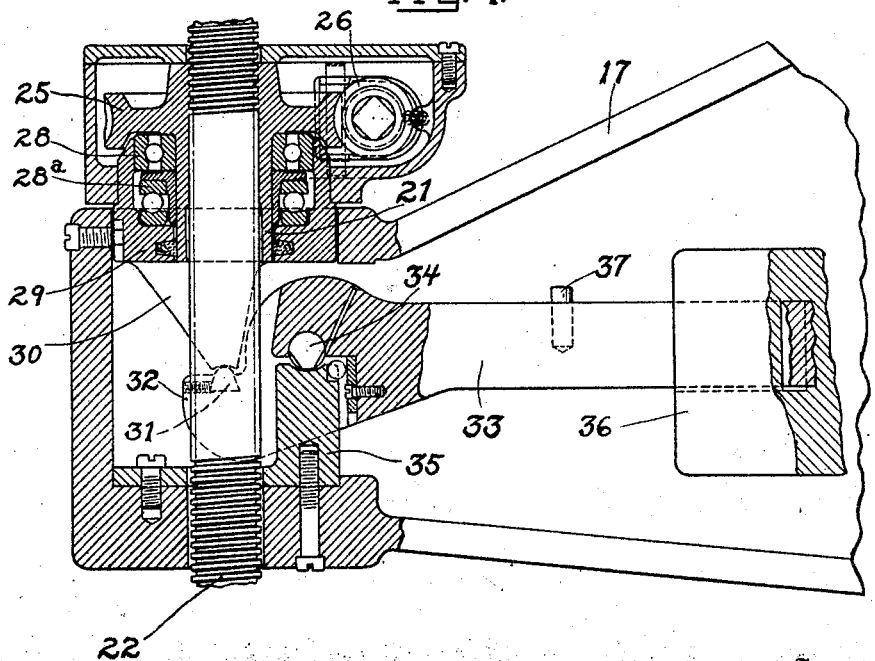

1,480,592

UNITED STATES PATENT OFFICE.

LOUIS GARFIELD BAYRER, OF HARTFORD, CONNECTICUT, ASSIGNOR TO PRATT & WHITNEY COMPANY, OF NEW YORK, N. Y., A CORPORATION OF NEW JERSEY.

COUNTERBALANCING MECHANISM.

Application filed September 6, 1921. Serial No. 498,834.

*To all whom it may concern:*

Be it known that I, LOUIS G. BAYRER, a citizen of the United States, residing at Hartford, in the county of Hartford and State of Connecticut, have invented certain new and useful Improvements in Counterbalancing Mechanism, of which the following is a specification.

This invention relates to machine tools and particularly to a counterbalancing mechanism for partially supporting a heavy piece of work to relieve the work table of a part of the load whereby the table is not subjected to unbalanced strains and may be fed easily and smoothly by the operator as desired. The general construction and operation of such a machine is more fully described in my Patent No. 1,329,358, granted February 3, 1920.

In my aforesaid patent, means is illustrated for counterbalancing the work and for adjusting the counterbalance to allow for work of different weights. The means illustrated therein however may not be of sufficient range within itself for counterbalancing either very light or very heavy work pieces. The primary object of the present invention is to provide a very simple auxiliary means whereby very light work or extremely heavy work or work of any intermediate weight may be readily and easily counterbalanced to a fine or accurate degree.

It is another object of the invention to provide adjustable or interchangeable means for readily varying the counterbalancing effect of the counterbalancing mechanism, such means comprising weight-receiving means mounted on a support and extending from the opposite sides thereof, one side of such means engaging a counterbalancing lever and the means comprising the weights for the said sides being adjustable or interchangeable whereby to vary the counterbalancing effect of the lever.

A further object of the invention is to provide a counterbalancing means auxiliary to that shown in my aforesaid patent, such auxiliary means being adjustable within wide limits to vary the counterbalancing effect of the counterbalancing means, the counterbalancing weight illustrated in my aforesaid patent being used in this improved machine particularly for the purpose of securing a fine or accurate adjustment.

With the above and other objects in view, my invention consists in the features of construction and operation set forth in the following specification and illustrated in the accompanying drawings. In such drawings annexed hereto and forming a part of this specification, I have shown my invention embodied in a milling or die-sinking machine but it will be understood that the invention can be otherwise embodied and that the drawings are not to be construed as defining or limiting the scope of the invention, the claims appended to this specification being relied upon for that purpose.

Referring to the figures of the drawings:

Figure 1 is a front elevation of a machine embodying my invention.

Fig. 2 is a side elevation thereof.

Fig. 3 is an enlarged plan view of the outer end of one of the work-supporting arms.

Fig. 4 is a vertical sectional view thereof.

Referring more specifically to the drawings by reference characters, 1 designates the base and 2 the column of a vertical milling or die-sinking machine. The tool spindle 3 is rotated from a power means 4 through a belt 5. This spindle mechanism is illustrated and described in detail in a copending application Serial No. 487,871, filed July 27, 1921, to J. J. Thacher.

A knee 6 is supported on the base and is vertically adjustable thereon by means of a screw 7. A saddle 8 is supported on the knee and may be moved forward and backward thereon by a hand means 9. A table 10 is mounted for longitudinal sliding movement on the saddle. Studs $7^a$ and $10^a$ are provided to receive the hand means 9 thereon for moving the knee and table respectively by hand. It will be understood that the knee, saddle and table may all be operated either by power or hand. The power for operating such members is derived from the main power means 4 through a telescopic shaft 11. Means 12 and 13 are provided at the front of the machine for controlling the tool rotating speeds and the table operating speeds respectively. Since the portion of the machine thus far described does not within itself comprise a part of this invention, further description thereof will be omitted herein, it being understood however that the table and its supporting members are adapted to be operated either by hand or automatically.

Projecting from each side of the column are fixed brackets 14, and supported on each pair of these brackets and pivotally connected thereto by a pin 15 is an articulated arm, comprising an inner member 16 and an outer member 17, which are hinged together by a pin 18. These arms are given the necessary shape to provide the requisite strength to sustain the stresses to which they will be subjected and are desirably made hollow so as to eliminate as much weight as possible.

At the outer ends of the outer members of the arms are means designed to be attached to the ends of the block of metal 19 in which the die is to be cut, this block being fastened by suitable clamps 20 to the top of the table. The means illustrated for supporting the ends of the die stock consists of a sleeve 21 which is loosely mounted in the end of each arm and has an interior thread through which passes a threaded rod 22. The lower end of the rod 22 is provided with an opening for receiving the stud 23 which is fastened to the end of the die-stock by clamping means 24. This clamp is illustrated and described in detail in my copending application, Serial No. 415,557, filed August 8, 1920. The upper end of the sleeve is in the form of a worm wheel 25 engaged by a worm 26 adapted to be rotated by a handle 27 for the purpose of raising or lowering the threaded supporting rod and thus elevating or lowering the die-stock. The sleeve which carries the threaded rod is free to have a slight vertical movement in the opening in the outer end of the arm and ball bearings 28 and 28$^a$ are provided to relieve the friction when the sleeve is rotated. A collar 29 holds the ball bearings in place and supports the sleeve. This collar has a downwardly projecting tapering saddle 30 at each side of the sleeve, such saddle resting upon the upper edges of hardened blocks 31 set into the upper edges of forked ends 32 at the end of a counterbalancing lever 33. This counterbalancing lever is fulcrumed on a hardened fulcrum block 34 resting on a supporting element 35 of the arm. Movable along the lever is a counterbalancing weight 36, a pin 37 being provided for limiting the inward travel of the weight.

When working on comparatively light pieces of work, the counterbalancing mechanism thus far described is sufficient to properly counterbalance the work to relieve the table of a portion of the weight of the work. However, when operating on real heavy work a counter weight 36 would be required which would be too heavy to be manipulated by hand and a set of different sized weights to meet all conditions would be extremely cumbersome. The object of this invention is to provide means preferably permanently in connection with the counterbalancing levers and adapted to accurately counterbalance work of any weight between wide limits. The details of this improved means will now be described.

Counterbalance weight supporting means, as a pulley 38, is mounted on the supporting arm 17. Weight receiving and supporting means comprising a chain 39 having an element 40 at one end and a sleeve 41 at the other end is suspended from a pulley. The element 40 is secured to the end of the long arm 33$^a$ of the lever 33. A rod 42 is screw threaded into the arm 17 and extends into the sleeve 41 whereby to guide the sleeve against lateral movement. The element 40 and sleeve 41 are each adapted to receive a weight or weights thereon. A plurality of weights 43 are illustrated in the drawings as mounted thereon, such weights being interchangeable from one side of the pulley to the other. It will be seen that the weights on the element 40 tend to force the long arm 33$^a$ of the lever downwardly and the weights on the sleeve 41 tend to raise the arm upwardly. By placing an equal number of weights on both sides, no counterbalancing effect is exerted on the lever other than its own weight and that of weight 36. The interchanging of a counterweight from one side to the other exerts a vertical force on the end of the lever equal to twice the weight of such counterweight, such force being exerted upwardly or downwardly depending upon from which side the counterweight is interchanged. When it is desired to counterbalance heavy work, weights may be interchanged from the sleeve to the element 40, thereby forcing the long arm of the lever downwardly. By this interchange of weights the approximate desired counterbalancing effect on the work may be secured, the sliding weight 36 being then adjusted along the arm 33$^a$ to secure as fine and accurate adjustment as may be desired.

What I claim is:

1. In a machine tool, a work supporting mechanism comprising the combination of a support, a lever fulcrumed between the ends thereof on the support and comprising a short arm and a long arm, means on the short arm of the lever for supporting a piece of work, and counterweight means operatively connected to the long arm of the lever and adjustable in a manner to exert either a downward or upward force on the said long arm.

2. In a machine tool, a work supporting mechanism comprising the combination of a support, a lever fulcrumed between the ends thereof on the support and comprising a short arm and a long arm, means on the short arm of the lever for supporting a piece of work, counterbalance weight-supporting means on the support, and weight-receiving means supported on and extending to the opposite sides of the said weight-supporting means, one side of the weight-receiving means being connected to the long arm of the lever and the means comprising the weights of the weight-receiving means being adjustable to vary the counterbalancing effect on the lever.

3. In a machine tool, a work supporting mechanism comprising the combination of a support, a lever fulcrumed between the ends thereof on the support and comprising a short arm and a long arm, means on the short arm of the lever for supporting a piece of work, counterbalance weight-supporting means on the support, and weight-receiving means supported on and extending to the opposite sides of the said weight-supporting means, one side of the weight-receiving means being connected to the long arm of the lever and the means comprising the weights of the weight-receiving means being interchangeable from one side to the other to vary the counterbalancing effect of the lever.

4. In a machine tool, a work supporting mechanism comprising the combination of a support, a lever fulcrumed between the ends thereof on the support and comprising a short arm and a long arm, means on the short arm of the lever for supporting a piece of work, a pulley on the support, weight-receiving means passing over the pulley and depending from the opposite sides thereof, and a plurality of weights adapted to be hung on either side of the weight-receiving means, one side of such means being connected to the long arm of the lever and the said weights being interchangeable from one side to the other to vary the counterbalancing effect of the lever.

5. In a machine tool, a work supporting mechanism comprising the combination of a support, a lever fulcrumed between the ends thereof on the support and comprising a short arm and a long arm, means on the short arm of the lever for supporting a piece of work, counterbalance weight-supporting means on the support, weight-receiving means supported on and extending to the opposite sides of the said weight-supporting means, one side of the weight-receiving means being connected to the long arm of the lever and the means comprising the weights of the weight-receiving means being adjustable to vary the counterbalancing effect of the lever, and a counterbalance weight slidable along the long arm of the lever for giving a fine adjustment to the counterbalance.

6. In a machine tool, the combination of a column, a cutting tool mounted on the column, a table movable below said tool, mechanism for feeding the table horizontally, articulated arms pivotally mounted on the column and adapted to swing above the table, work supports loosely mounted on said arms, levers carried by the arms and adapted to lift said supports, and counterweight means operatively connected to the levers and adjustable in a manner to exert either a downward or upward force on the levers.

7. In a machine tool, the combination of a column, a cutting tool mounted on the column, a table movable below said tool, mechanism for feeding the table horizontally, articulated arms pivotally mounted on the column and adapted to swing above the table, work supports loosely mounted on said arms, levers carried by the arms and adapted to lift said supports, counterweight supporting means on each arm operatively connected to the lever, and a plurality of counterweights supported on the said means and interchangeable in a manner to exert either a downward or upward force on the lever.

8. In a machine tool, the combination of a column, a cutting tool mounted on the column, a table movable below said tool, mechanism for feeding the table horizontally, articulated arms pivotally mounted on the column and adapted to swing above the table, work supports loosely mounted on said arms, levers carried by the arms and adapted to lift said supports, a pulley on each arm, a counterweight supporting member passing over the pulley and depending from the opposite sides thereof, one end of such member being operatively connected to the lever, a counterweight supporting element on the other end of the member, and a plurality of counterweights on the member, the counterweights being adapted to be interchanged from one side of the pulley to the other side to exert either a lifting or depressing force on the lever.

9. In a machine tool, the combination of a column, a cutting tool mounted on the column, a table movable below said tool, mechanism for feeding the table horizontally, articulated arms pivotally mounted on the column and adapted to swing above the table, work supports loosely mounted on said arms, levers carried by the arms and adapted to lift said supports, a counterweight supporting member supported between its ends on each arm, one end of such member being operatively connected to the lever, a counterweight receiving element on the other end of the member, a plurality of counterweights on the member, the counterweights being adapted to be interchanged from one end of the member to the other end to exert either a lifting or depressing force on the lever, and a counterbalancing weight slidable along each lever for giving a fine counterbalancing adjustment to the levers.

10. In a machine tool, the combination of a column, a cutting tool mounted on the column, a table movable below said tool, mechanism for feeding the table horizontally, articulated arms pivotally mounted on the column and adapted to swing above the table, a lever fulcrumed on each arm, means connected to each lever adjacent its fulcrum for supporting a piece of work on the table, and means connected to each lever remote from its fulcrum and exerting a work lifting force on the lever, the last said means being adjustable to vary its force exerted on the lever.

11. In a machine tool, the combination of a column, a cutting tool mounted on the column, a table movable below said tool, mechanism for feeding the table horizontally, articulated arms pivotally mounted on the column and adapted to swing above the table, a lever fulcrumed between the ends thereof on each arm and comprising a long and a short arm, means connected to the short arm of each lever for supporting a piece of work on the table, means connected to the long arm of each lever remote from its fulcrum and adjustable to approximately exert a desired work lifting force on the lever, and a weight adjustable along the long arm of each lever to vary the work lifting action of such weight on the lever and finely counterbalance the work.

In testimony whereof, I hereto affix my signature.

L. GARFIELD BAYRER.